(No Model.) 3 Sheets—Sheet 1.

W. MASON.
MAGAZINE FIREARM.

No. 539,528. Patented May 21, 1895.

Witnesses:
Chas. B. Shumway
J. A. York Jr.

Inventor
William Mason
by Robinson Aiken
his attorney (No Model.) 3 Sheets—Sheet 2.
W. MASON.
MAGAZINE FIREARM.
No. 539,528. Patented May 21, 1895.
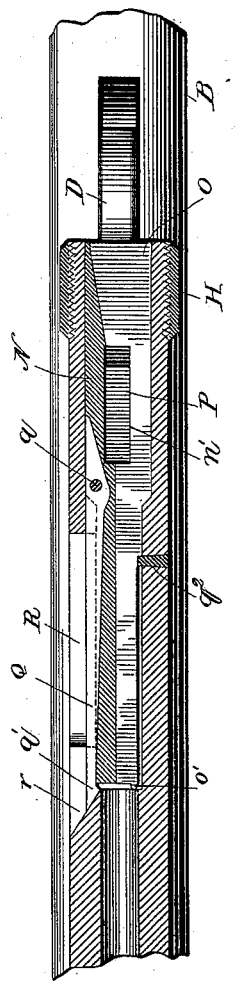
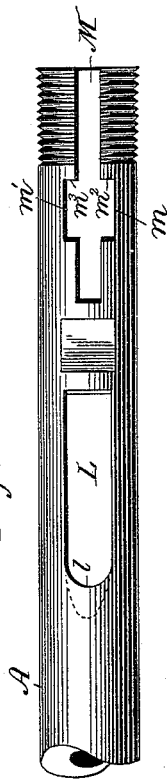
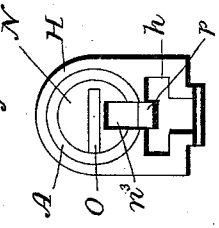
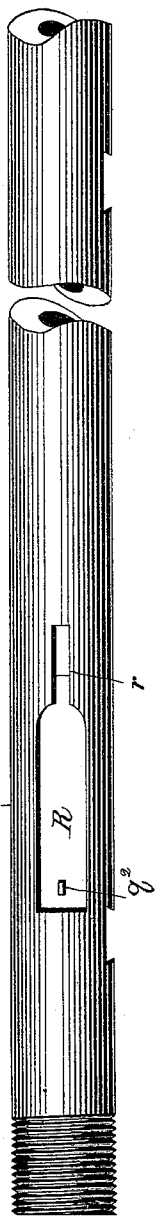
Witnesses:
Chas. B. Shumway
J. A. York Jr.
Inventor:
William Mason
by Robinson & Fisher
his attorneys (No Model.) 3 Sheets—Sheet 3.

W. MASON.
MAGAZINE FIREARM.

No. 539,528. Patented May 21, 1895.

Witnesses:
Chas. B. Shumway
J. A. York Jr.

Inventor
William Mason
by Robinson Fisher
his attorneys

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

MAGAZINE-FIREARM.

SPECIFICATION forming part of Letters Patent No. 539,528, dated May 21, 1895.

Application filed March 4, 1895. Serial No. 540,500. (No model.)

*To all whom it may concern:*

Be it known that I, WILLIAM MASON, a citizen of the United States, and a resident of the city of New Haven, county of New Haven, State of Connecticut, have invented a new and useful Improvement in Repeating Breech-Loading Firearms, which is fully set forth in the following specification, taken in connection with the drawings, which form a part thereof, and in which the same letters of reference represent like parts in all the figures.

Figure 1:
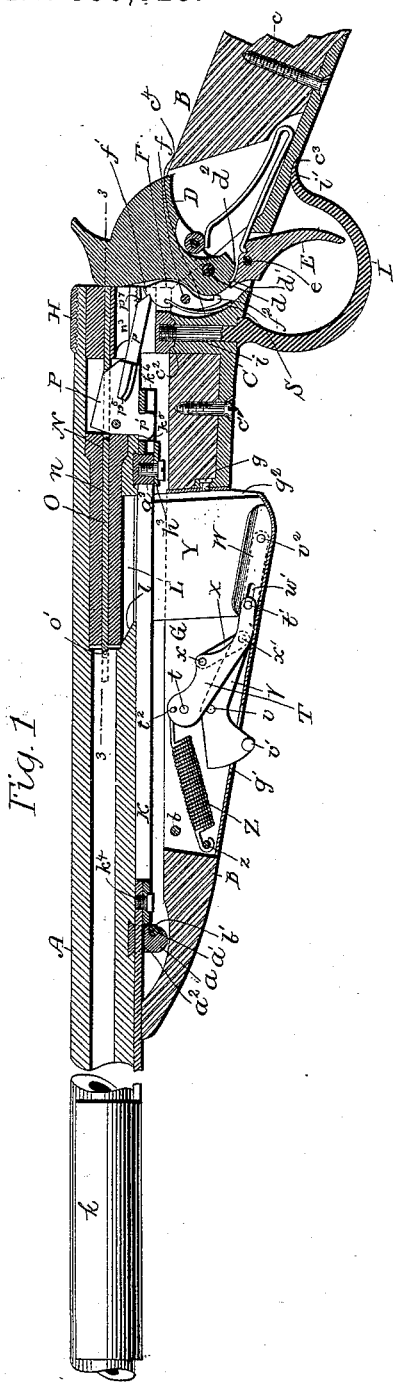
Figure 2:
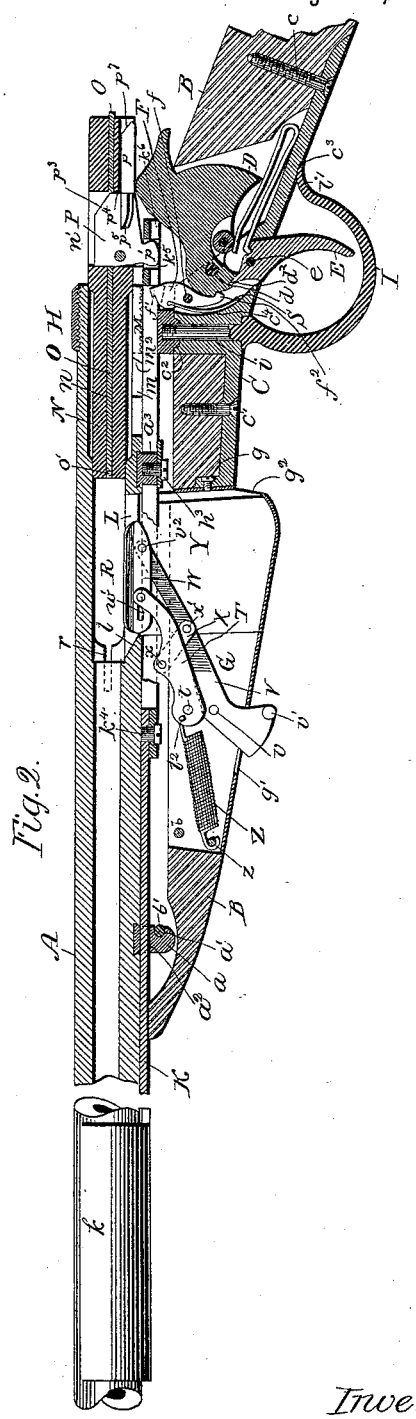
Figure 8:
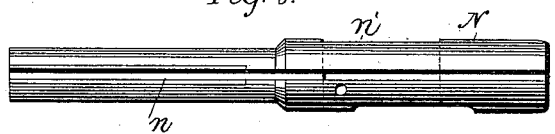
Figure 9:
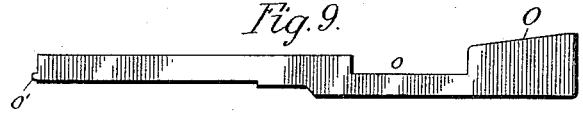
Figure 10:
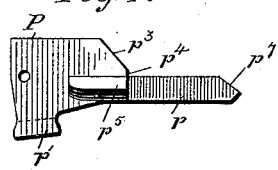
Figure 11:
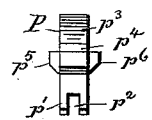
Figure 12:
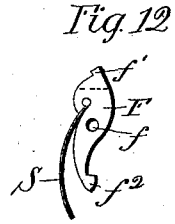
Figures 13, 18:
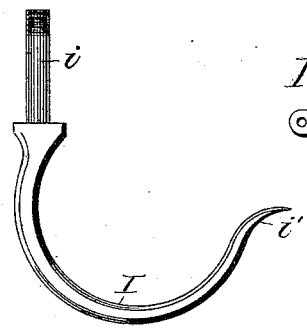
Figure 14:
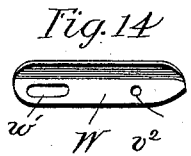
Figure 15:
Figure 16:
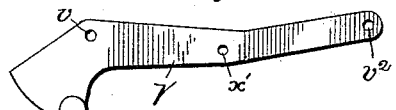
Figure 17:
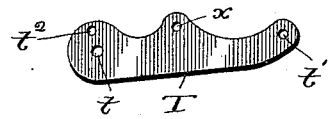

Figure 1 is a view of a gun embodying this invention, taken partly in side elevation, partly in section, showing the carrier mechanism drawn downward for charging; Fig. 2, a similar view of the gun with the carrier mechanism in its normal position and the hammer, breech-bolt, and associated parts withdrawn for loading; Fig. 3, a sectional view of the barrel on lines 3 3 of Fig. 1; Fig. 4, a bottom view of the action-handle detached from the gun; Fig. 5, a rear elevation of the barrel; Fig. 6, a bottom view of the barrel; Fig. 7, a side elevation of the barrel; Fig. 8, a side elevation of the breech-bolt; Fig. 9, a plan view of the firing-pin; Figs. 10 and 11, detailed views of the breech-brace; Fig. 12, a detailed view of the safety-catch lever and spring; Fig. 13, a detailed view of the guard; Figs. 14 and 15, a side elevation and end view of the carrier-cradle; Figs. 16 and 17, detailed views of the carrier and equalizing levers, respectively; Fig. 18, a detailed view of connecting-link.

This invention relates to repeating breech-loading firearms, of the type known as the box magazine gun, and has for its object the production of an arm, simple in construction and reliable and safe in operation.

The improvements in firearms embodied in this invention consist of a carrier of accurately adjusted compound levers; an effective and simple safety catch mechanism and a readily detachable barrel, claimed and described hereinafter, together with minor improvements.

In the drawings A represents the barrel; B, the stock; C, the lower tang connected to the stock by the screws $c$ and $c'$ and having pivoted thereto the hammer D at $d$, trigger E at $e$ and safety catch lever F at $f$.

Within the forward part of the stock B the metallic shell forming the chamber G is secured to the end of the lower tang C by the screw $g$ and to the stock by the horizontal pin $b$.

Within the chamber G is the magazine Y for the reception of cartridges. Carrier lever V, pivoted horizontally by a pin $v$ in the chamber G to swing in a vertical plane, extends through a slot $g'$ in the under side of said chamber and has formed on this extension laterally extending studs or knobs $v'$ for the thumb or finger of the operator.

The carrier cradle W within the magazine Y pivoted to the carrier lever V at $v^2$, is divided horizontally on its upper side to form an angular recess $w$ for the cartridge, entered through an opening $g^2$ in the chamber G and fed into the barrel through an opening L in the under side thereof. (Described hereinafter.) An equalizing lever T, pivoted to a pin $t$ in the chamber to swing in a vertical plane, engages by the lug $t'$ in the lateral slot $w'$ in the carrier cradle W, and is connected at $t^2$ to a spring Z (spiral or otherwise) secured in the chamber at some point as $z$. The tension of the spring Z by means of the equalizing lever T is constantly exerted to raise the carrier cradle W and the end of lever V pivoted thereto. The slot $w'$ in the cradle allows the cradle a slight longitudinal motion on the lug $t'$ of the equalizing lever, and the connecting link X pivoted to the equalizing lever T and carrier lever V at $x$ and $x'$ respectively draws the lug $t'$ to the rear end of slot $w'$ when the carrier cradle is in its highest position and to the forward end of the slot when in the lowest position. This longitudinal play of the carrier cradle on the lug $t'$ prevents the fore end of the cradle from being raised out of alignment with the rear when the cartridge is about to be fed into the barrel. By the same means, when the cradle is lowered, by pressure exerted on the knobs $v'$, the forward end of the cradle is tilted slightly upward in comparison with the rear end, so that when a number of cartridges with their flanged rear ends are placed in the magazine the upper one will always be in proper alignment, as it is presented by the cradle into the barrel through the opening L.

The take-down of the gun is as follows: Dovetailed in a transverse slot in the barrel A is a stud $a$ with a recess or groove $a'$ adapted to engage with a horizontal pin $b'$ in the stock. A jacket H reinforces the butt end of the barrel, its lower portion adapted to fit in a transverse groove $c^2$ with chamfered sides in the lower tang C and to be engaged by a screw $i$, passing through the lower tang, connected to and formed integral with the guard I, the end $i'$ of which may engage in a detent $c^3$ in the lower tang. By unscrewing the guard I and screw $i$ from the jacket H, the butt end of the barrel may be raised to disengage the lower portion of the jacket from the transverse groove $c^2$ of the lower tang and be moved forward to disconnect the stud $a$ from the pin $b'$, thereby attaching the barrel easily and readily.

The action handle K extending longitudinally with and under the barrel A, slides through an opening $a^2$ in the stud $a$ and the horizontal slot $h$ in the lower portion of the jacket H, and may be further secured to the barrel by the plate and screw $h^3$, the latter passing through a vertical slot $k^3$ extending longitudinally within the action handle and engaging with a stud $a^3$ dovetailed in a transverse groove in the barrel. The action handle K may be divided into two portions, united by a slot and groove $k^4$, the forward portion adapted to partially surround the barrel at $k$ and the rear having a vertical opening $k^5$ and longitudinal slot $k^6$.

In the under side of the barrel is the opening L for the admission of cartridges, its forward end $l$ inclined inwardly toward the forward end of the gun, and the vertical slot M extending to the butt end of the gun with the vertical grooves $m$ and $m'$ on either side thereof.

The breech bolt N of cylindrical form to fit and move longitudinally within the butt end of the barrel, is slotted horizontally at $n$ to take in the firing pin O, and vertically at $n'$, within which latter slot is pivoted the breech brace P to swing in a vertical plane. The firing pin O recessed at $o$ to fit about the breech brace P has the point $o'$ to extend slightly beyond the breech bolt N to impinge against the cartridge when the rear end of the firing pin is struck by the hammer D. An arm $p$ of the breech brace is adapted to fit within the recess $n^3$ in the under side of the breech bolt, extending to the rear end thereof, and a heel $p'$ slotted at $p^2$ passing through the slot M in the under side of the barrel, engages loosely within the vertical slot $k^5$ of the action handle K, thereby transmitting any longitudinal movement of the action handle to the breech bolt N (as the breech brace P is pivoted thereto). The upper portion of the breech brace P is chamfered at $p^3$, to act as a retractor, of the firing pin leaving a vertical surface $p^4$ above the arm $p$, to lock the firing pin O when engaged with the rear end of the recess $o$ of the firing pin O, preventing the projection of the point $o'$ beyond the breech bolt, as shown in Fig. 2.

On either side of the breech brace P are small blocks $p^5$, and $p^6$, hereinafter called the recoil shoulders, curved on the forward portion of their under sides and adapted to fit within the grooves $m$ and $m'$ of the vertical slot M and when so fitted the rear ends of said recoil shoulders engage with the rear ends $m^2$ and $m^3$ of the grooves $m$ and $m'$, which form breech abutments to check the recoil of the breech bolt N in firing, by means of the connection between the breech bolt and the breech brace. The recoil shoulders $p^5$ and $p^6$ are engaged with the breech abutments when the breech brace and breech bolt are in their most forward position ready for firing, and when said recoil shoulders are so engaged the lock $p^4$ is released from engagement with the firing pin O, allowing the point $o'$ to impinge the cartridge.

The safety catch lever F pivoted at $f$, notched at both ends ($f'$ and $f^2$) has connected thereto a spring S which bears with its free end against the curved face $c^4$ of the lower tang C. The lower notch $f^2$ may interlock with the half cock notch $d'$ of the hammer D when the hammer D is fully cocked, and the trigger E may engage with the full cock notch $d^2$. When the breech brace P is in its forward position and the recoil shoulders $p^5$ and $p^6$ engaged with the breech abutments $m^2$ and $m^3$, the arm $p$ engages by means of its beveled end $p^7$ with the notch $f'$ of the lever F, overcoming the tension of the spring S, and releasing the hammer D from being interlocked with the lower notch $f^2$.

The rearward movement of the action handle K by means of the loose engagement of the heel $p'$ of the breech brace in the slot $k^5$ first swings the breech brace P on its pivot forcing the arm $p$ out of engagement with the notch $f'$, and allowing the lever F to again lock with the hammer D upon the full cocking of the latter, and drives the recoil shoulders $p^5$ and $p^6$ out of connection with the breech abutments $m^2$ and $m^3$. At the same time the retracting surface $p^3$ draws the firing pin O slightly rearward to engage the lock $p^4$ with said firing pin. Continued rearward movement of the action handle is transmitted by the breech brace P to the breech bolt N, forcing said breech bolt rearward and in turn withdrawing the hammer to a full cock, as shown in Fig. 2, the breech brace and action handle passing over the lever F by means of the slots $p^2$ and $k^6$.

The extractor Q connected to the breech bolt at $q$ to fit in the elongated portion $r$ of the lateral opening R in the barrel, is notched at $q'$ to engage the rim of the cartridge in the chamber of the barrel and upon the rearward movement of the breech bolt draws the cartridge rearward into contact with the ejector pin $q^2$ in the barrel, thereby forcing the cartridge about and ejecting it through the opening R. A fresh cartridge being fed into the barrel through the under opening L by means of the carrier mechanism, which cannot be done until the hammer is fully cocked, the action handle may be forced forward and the breech bolt N will drive the cartridge into its chamber. When the cartridge and breech bolt are in place for firing, the further forward movement of the action handle, swinging the breech brace downward, withdraws the lock $p^4$ from contact with the firing pin O and engages the recoil shoulders $p^5$ and $p^6$ with the breech abutments $m^2$ and $m^3$ and the arm $p$ with the notch $f'$. As has been shown, the hammer is thereby released from being locked with the lower notch $f^2$ of the lever F, and upon being disengaged from the trigger E, is free to discharge the gun. By means, therefore, of the lock $p^4$ and safety catch mechanism, the firing pin O is prevented from impinging on the cartridge and the hammer D withheld, until the breech bolt N by its connection with the breech brace P and the recoil shoulders $p^5$ and $p^6$ are locked with the breech abutments $m^2$ and $m^3$ and the premature discharge of the gun is thus prevented.

The details of this construction may be varied somewhat without departing from the spirit of this invention, but

What I claim as new and original is—

1. In a repeating breech-loading box magazine gun, the combination in the stock thereof, with a magazine; of a carrier cradled within said magazine; a carrier lever and an equalizing lever pivoted in the stock at different centers to swing in vertical planes, and connected with said carrier cradle, said equalizing lever being loosely connected by means of a longitudinal slot; and a connecting link pivoted to said equalizing lever and carrier lever, substantially as described.

2. In a repeating breech loading box magazine gun, the combination in the stock thereof, with the magazine having a passage in its under side; of a carrier cradled in said magazine; a spring, the tension of which constantly forces said carrier upward; and a carrier lever pivoted to swing in a vertical plane, having one end attached to said carrier cradle, and the other projecting through said under passage in said magazine, substantially as described.

3. In a breech loading fire arm, the combination with the barrel thereof; of a lower tang; a hammer and a safety catch lever pivoted to said lower tang and adapted by means of a spring to interlock, when said hammer is fully cocked; a breech bolt within the barrel; and a breech brace pivoted within said breech bolt, adapted to engage with breech abutments in said barrel when said breech bolt is fully closed for firing, and having an arm constructed to engage with said safety catch lever overcoming the tension of said spring, when the breech brace is engaged with said breech abutments, substantially as described.

4. In a breech loading fire arm, the combination with the barrel thereof, with the breech bolt slotted horizontally and vertically; of a firing pin adapted to be taken in said horizontal slot and extending forwardly beyond said breech bolt; and a breech brace pivoted in said vertical slot and having laterally extending recoil shoulders to interlock with breech abutments in the barrel when said breech brace is swung downward and a retractor to force rearward said firing pin, and a surface to lock said firing pin when said breech brace is swung upward, substantially as described.

5. In a fire arm, the combination with the barrel; of the stock having a horizontal pin adapted to be engaged by a stud in the barrel; and a guard with a screw formed integral therewith to pass through said stock and engage with the butt end of the barrel, substantially as described.

6. In a fire arm, the combination with the barrel; of the stock having a horizontal pin adapted to be engaged by a stud in the barrel; and a guard having one end prolonged to form a screw to pass through said stock and engage with the butt end of the barrel, the other end to lock in a detent in said stock, substantially as described.

In witness whereof I have hereunto set my hand this 26th day of February, 1895.

WILLIAM MASON.

Witnesses:
DANIEL H. VEADER,
WILLIAM S. BALDWIN.